United States Patent [19]

Kirker

[11] Patent Number: 5,331,130
[45] Date of Patent: Jul. 19, 1994

[54] METHOD AND APPARATUS FOR FUSING TERMINAL OR COMMUTATOR WIRE CONNECTIONS ON AN ARMATURE OR STATOR

[75] Inventor: Eric J. Kirker, Vandalia, Ohio

[73] Assignee: Odawara Automation, Inc., Tipp City, Ohio

[21] Appl. No.: 949,383

[22] Filed: Sep. 22, 1992

[51] Int. Cl.$^5$ ............................................. B23K 11/31
[52] U.S. Cl. .................... 219/86.51; 219/56.1; 219/86.7
[58] Field of Search ............... 219/86.8, 86.41, 86.51, 219/86.61, 86.7, 86.25, 86.33, 56.1, 56.21, 56.22, 117.1

[56] References Cited

U.S. PATENT DOCUMENTS

| | | |
|---|---|---|
| 3,045,103 | 7/1962 | Warner . |
| 4,356,373 | 10/1982 | Mattson et al. . |
| 4,371,772 | 2/1983 | Szantho et al. . |
| 4,393,298 | 7/1983 | Frantzreb, Sr. . |
| 4,419,558 | 12/1983 | Stiebel ............................ 219/86.51 |
| 4,451,722 | 5/1984 | Szantho et al. . |
| 4,504,724 | 3/1985 | Szantho et al. . |
| 4,510,370 | 4/1985 | Szantho et al. . |
| 4,650,948 | 3/1987 | Roirdan . |
| 4,687,900 | 8/1987 | Warner ............................ 219/56.22 |
| 4,766,282 | 8/1988 | Riordan et al. . |
| 4,788,407 | 11/1988 | Flater . |
| 4,904,838 | 2/1990 | Szantho et al. . |
| 5,063,279 | 11/1991 | Rossi ............................... 219/86.51 |
| 5,111,015 | 5/1992 | Riordan . |
| 5,138,127 | 8/1992 | Fries et al. ..................... 219/86.51 |
| 5,266,767 | 11/1993 | Rossi ............................... 219/86.25 |

*Primary Examiner*—Geoffrey S. Evans
*Attorney, Agent, or Firm*—Thompson, Hine and Flory

[57] ABSTRACT

An apparatus and method for fusing terminal or commutator wire connections on an armature or stator, including an electrode, a pneumatic locking cylinder for driving the electrode into contact with the workpiece and applying a force to the workpiece, a load cell for measuring the force applied by the electrode, an opposition cylinder for providing an opposition force to the electrode after a cold-forming force has been reached by the electrode, a linear potentiometer for measuring the distance traveled by the electrode after the opposition force has been applied; and a locking mechanism for stopping the locking cylinder after a predetermined distance has been traveled during the weld cycle.

15 Claims, 6 Drawing Sheets

METHOD AND APPARATUS FOR FUSING TERMINAL OR COMMUTATOR WIRE CONNECTIONS ON AN ARMATURE OR STATOR

BACKGROUND OF THE INVENTION

This invention generally relates to a fusing apparatus and, more particularly, to a machine for fusing the armature wires of an electric motor to a tang or slot of a commutator bar and for fusing wires to stator hooks.

Although fusing machines are widely known, more precise, efficient and economical machines are greatly needed.

Existing methods for the mechanical manipulation of a fusing electrode as related to both armature tang fusing and stator terminal fusing include pneumatically driven slides as well as a ball screw driven slides controlled by a servo motor. Pneumatics have proven to be functional but include inherent deficiencies. First, they are not easily adjusted for fine tuning of the fusing forces. A pressure regulator may be adjusted, which will increase or decrease the fusing force, but does not give the user an actual reading of the forces since the driving cylinder output force is not directly obtainable from the regulator gauge. Alternatively, the tension on a spring results in a non-precision change in the fusing forces.

The use of servo motors to regulate the fusing forces as shown in U.S. Pat. No. 5,063,279 to Axis USA, Inc. has also proven to be inefficient. Servo motors are excellent devices for fast, accurate positioning but they are not designed to be torque limiters. Even with external force feedback gauges it is very difficult, if not impossible, to design a control system fast enough to react to a rapidly changing force curve relating the position of a ball screw driven by a servo motor to a known, constant fusing force. Another limiting factor with a servo motor is cost. Servo systems are both expensive and costly to maintain in severe applications.

An additional problem with prior fusing apparatus is the difficulty encountered in changing an exhausted electrode. The electrode is located in the fusing head, and to replace a worn out electrode usually requires the fusing head to be disassembled. Disassembling the fusing head requires the fusing apparatus to be inoperable for a prolonged period of time. This down time results in an inefficient fusing operation. Therefore, a need exists for an improved fusing apparatus that eliminates the problems associated with previous fusing machines, produces uniform connections, and provides for an easy, quick-change of the electrode.

SUMMARY OF THE INVENTION

The present invention is a fusing apparatus for making terminal or commutator wire connections on an armature or stator which eliminates the problems associated with prior fusing apparatus, produces uniform connections, and provides for a quick-change of the electrode. The fusing machine is effective to deform the tang around the wire and compress it such that a cohesive low resistance bond is formed.

In the present invention an armature is held by a spindle which is effective to rotate the armature such that tangs or slots are aligned under an electrode. A locking cylinder has a rod connected to a fusing head, and a load cell is connected at the interface of the locking cylinder rod and the fusing head to detect the force exerted by the electrode on the workpiece. Actuation of locking cylinder causes the fusing head and electrode to lower into contact with the tang or slot, compress the tang around the wire and upon encountering a predetermined cold-forming force determined by the load cell, initiate an electric current through the electrode and cold-formed tang wire combination to complete the fusing process.

After the predetermined cold-forming force is detected, an opposition cylinder is energized to provide an opposing force in opposition to the force provided by the locking cylinder. Consequently, the net force applied by the electrode to the tang is reduced. This insures a repeatable weld. The locking cylinder is a pneumatic cylinder having an internal mechanism that very quickly locks the cylinder into position in response to a command. After the predetermined cold-forming force is detected, an incremental displacement of the locking cylinder is measured by a linear potentiometer. Upon reaching a predetermined displacement, the locking cylinder is locked in position, thereby providing a precise and accurate end point to the measured incremental displacement.

The electrode may have to be changed several times during an operating shift, and therefore the present invention also includes a quick-change electrode holder. The electrode holder is releasably secured to the fusing head. The electrode holder is secured to the fusing head by a first interlocking piece retained within the electrode holder and a second interlocking piece which is connected to a pneumatic cylinder located within the fuser head. The first and second interlocking pieces are designed such that rotation of the pieces with respect to one another engages or disengages the electrode holder from the mount on the end of the rod. Actuation of the pneumatic cylinder within the fusing head causes the electrode holder to be displaced downwardly away from the fusing head allowing the operator to rotate the electrode holder to place the interlocking pieces into a released position, and the electrode holder may be removed from the fusing head. A new electrode holder is then inserted into the fusing head and rotated in an opposite direction to re-engage the interlocking pieces. The pneumatic cylinder is then again actuated causing the holder to be displaced upwardly into the fusing head and locked into position.

Accordingly, it is an object of the present invention to provide a fusing machine for making terminal or commutator wire connections on an armature or stator that provides precise and accurate placement of the electrode; a fusing machine that provides uniform connections; and a fusing machine that provides for quick-changing of the electrode holder.

These and other features and advantageous of the present invention will be better understood by reference to the following detailed description, the accompanying drawings and the appended claims.

DETAILED DESCRIPTION

Figure 1:
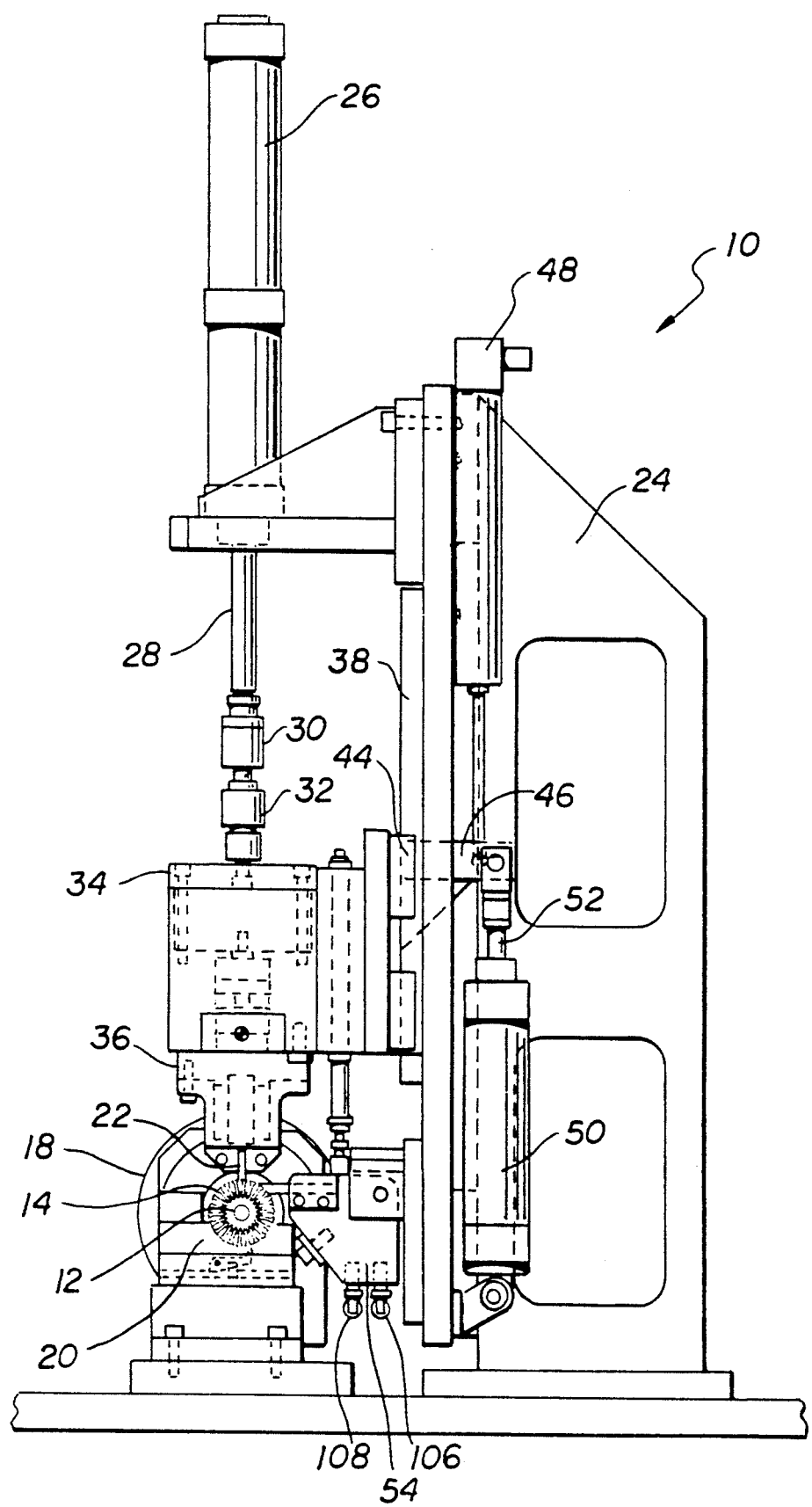
FIG. 1 is a front view of a fusing apparatus of the present invention.
Figure 2:
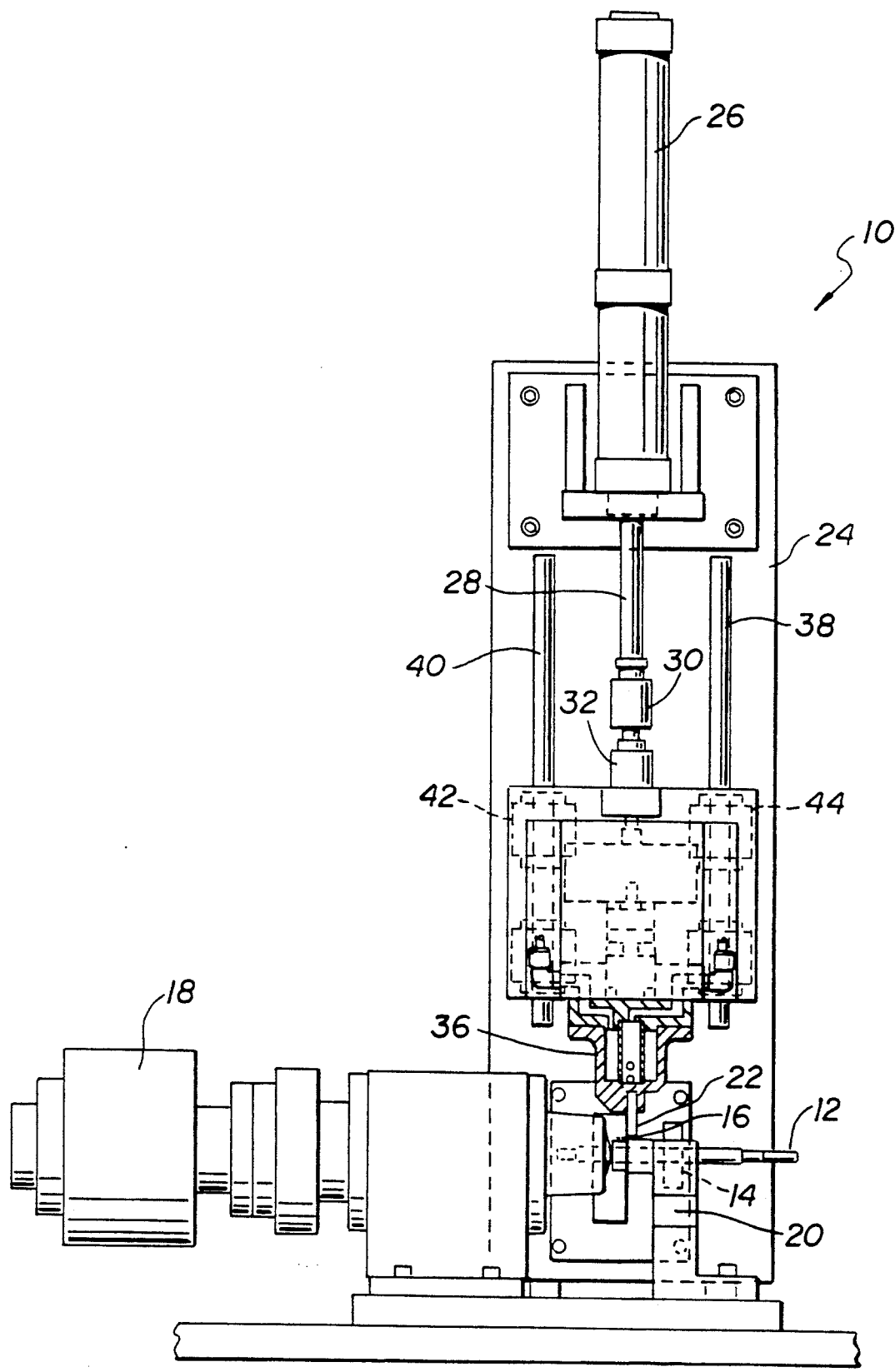
FIG. 2 is a side view of the fusing apparatus of FIG. 1.

A fusing apparatus, generally designated 10 of the present invention is shown in FIGS. 1 and 2. The fusing apparatus 10 is used to make terminal or commutator wire connection on an armature 12 or stator (not shown). While the invention is illustrated for making connections to an armature, those skilled in the art will appreciate that it is useful in making similar electrical connections to a stator or other electrical device. A winding machine is used to wind the rotor 14 and connect the wire into an open tang 16 or slot in a known manner. The fusing apparatus 10 is effective to deform the tang 16 around the wire and compress the tang such that a cohesive low-resistance bond is formed.

The armature 12 is held by a spindle 18 at one end and is supported in a cradle 20 on the opposite end. The spindle 18 is connected to a step motor (also not shown) which is effective to rotate the armature 12, such that the tangs 16 are sequentially aligned under the electrode 22.

The fusing apparatus 10 includes a support structure 24 to which a locking cylinder 26 is mounted with its top portion in alignment with the electrode 22. The locking cylinder is a conventional air cylinder having, in one embodiment, a 40mm bore and a 100mm stroke. The locking cylinder (26) has a cylinder rod (28) extending from the cylinder in the direction of the electrode 22. Located at the end of the cylinder rod 28 is a floating coupling 30 which connects the cylinder rod 28 to a load cell 32. The load cell 32 is positioned between the floating coupling 30 and the fusing head 34 and detects the force exerted by the electrode 22 on the tang 16. Connected to the bottom of fusing head 34 is an electrode holder 36, the fusing head and electrode holder including a quick-change mechanism, more of which will be discussed in detail subsequently.

The support structure 24 includes journals 38, 40, on which precision linear bearings 42, 44, positioned on the fusing head 34 may slide. The fusing head 34 is driven upwardly and downwardly on the journals 38, 40 by the locking cylinder 26. The fusing head 34 also includes an arm 46 extending between the journals 38, 40 perpendicularly thereto. A linear potentiometer 48 is connected to the upper portion of the support structure 24. The opposite end of the linear potentiometer is connected to the arm 46. The linear potentiometer measures the distance that the fusing head travels both prior to and after contacting the workpiece.

Attached to the lower portion of the support structure is an opposition cylinder 50. Opposition cylinder 50 is an air cylinder having a cylinder rod 52 extending upwardly and is connected to arm 46. Opposition cylinder 50 provides an opposition force which is delivered to the tang through the fusing head to reduce the force applied by the electrode during the fusing step. As the tang and wire are heated during the fusing step, less force is required to deform the tang. If the force on the tang is not reduced, the resistance decreases and more current is delivered to the workpiece, the workpiece heats up and the tang may be destroyed. Also connected to the lower portion of the support structure 24 is a ground electrode 54.

The locking cylinder 26 which is a pneumatic cylinder has an internal mechanism that very quickly locks the cylinder in position in response to a command. This feature is important because after a predetermined cold-forming force is detected by the load cell 32 an incremental displacement of the locking cylinder 26 is measured by the linear potentiometer 48. After a predetermined displacement is detected, the locking cylinder is locked into position, thereby providing a precise and accurate end point to the measured incremental displacement and insuring a proper connection of the workpiece. In addition, after the predetermined cold-forming force is detected, the opposition cylinder 50, which also is a pneumatic cylinder, is energized to provide an opposing force in opposition to the locking cylinder force, relieving the net force applied by the electrode to the tang. By relieving the net force on the tang, the weld will not be damaged by the electrode.

In an alternative embodiment, an opposition force can be delivered to the tang by incorporating two proportional valves on the locking cylinder 26, one located on either end of the cylinder. During the fusing step, the proportional valve positioned below the locking cylinder will be actuated to apply the opposition force to the cylinder thereby relieving a portion of the fusing force. In this embodiment, the opposition cylinder can be eliminated.

Figure 4:
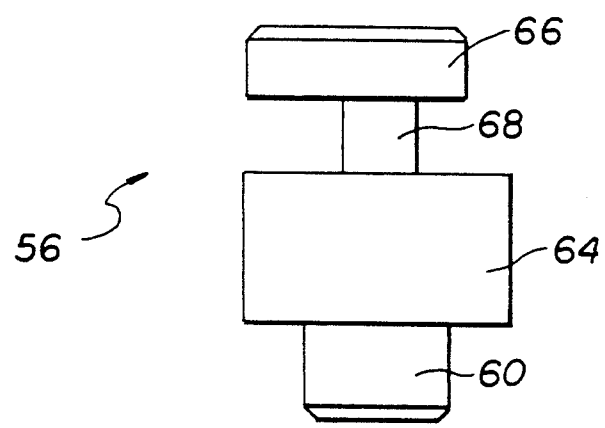
FIG. 4 is a perspective view of the first interlocking piece of the electrode locking mechanism of FIG. 3.
Figure 5:
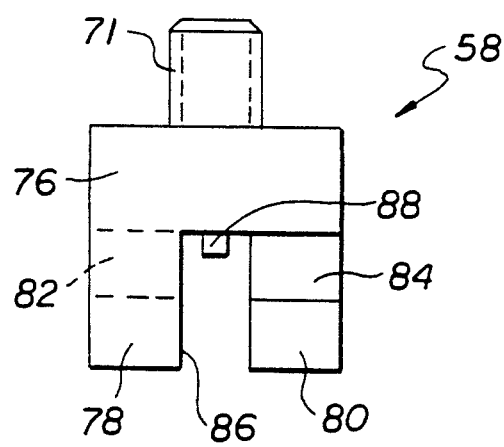
FIG. 5 is a perspective view of the second interlocking piece of the electrode locking mechanism of FIG. 3.

Typically the electrode 22 will have to be changed several times during an operating shift, consequently the fusing apparatus 10 is designed so that the electrode 22 can be changed quickly and easily. As can be seen best in FIG. 3 the electrode holder 36 is releasably secured to the fusing head 34. The electrode holder 36 includes a first interlocking piece 56 also shown in FIG. 4. The first interlocking piece 56 is rotatably connected to a second interlocking piece 58 secured within the fusing head 34 also shown in FIG. 5. The electrode 22 is attached to the electrode holder 36 by a clamping mechanism which provides for easy removal of a worn electrode.

The first interlocking piece 56 includes a lower portion 60 which is pinned within a water jacket portion 62 of the electrode holder 36. Located above the lower portion 60 of piece 56 is a middle portion 64 which supports an upper portion 66 which engages the second interlocking piece 58. The upper portion is supported displaced above the middle portion by a neck portion 68. Because the electrode has a beveled surface 70, the upper portion 66 of the first interlocking piece 56 is truncated on one end to assure that when the electrode holder is placed into the fusing head, proper alignment of the beveled surface 70 with respect to the workpiece is achieved.

The second interlocking piece 58 has a cylindrical upper portion 71 wherein a cylinder rod 72 extending from cylinder 74 is connected. Cylinder 74 is housed within the upper portion of the fusing head 34. Connected to the upper portion 66 of the second interlocking piece 58 is a middle portion 76. Extending from middle portion 76 are two legs 78, 80. Leg 78 has a horizontal channel 82 extending beyond the mid-portion of the interlocking piece. Similarly leg 80 has a horizontal channel 84 extending from an opposite surface beyond the mid-portion of the interlocking piece. Located between leg 78 and leg 80 is a vertical channel 86 having a width for receiving the upper portion 66 of the first interlocking piece 56. A pin 88 is attached to the lower surface of the middle portion 76 and is positioned for receiving the truncated end of upper portion 66 of the first piece 56 when the electrode holder is inserted into the fusing head.

To insert the electrode holder 36 into the fusing head 34, the upper portion 66 of the first interlocking piece 56 is inserted into the vertical channel 86 of the second interlocking piece 58. Once fully inserted, the electrode holder 36 is rotated 90° such that the upper portion 66 rotates into and is secured within horizontal channels 82, 84. Cylinder 74 is then actuated retracting cylinder rod 72 and the first and second interlocking pieces 56, 58. The electrode holder 36 is firmly locked adjacent the fusing head 34.

When the electrode has been exhausted, the entire electrode holder is removed by actuating cylinder 74 extending cylinder rod 72. The electrode holder is then rotated 90° in an opposite direction disengaging the upper portion 66 of the first interlocking piece from the horizontal channels 82, 84 of the second interlocking piece. The electrode holder 36 can then be removed and an electrode holder carrying a new electrode is reinserted.

Figure 3:
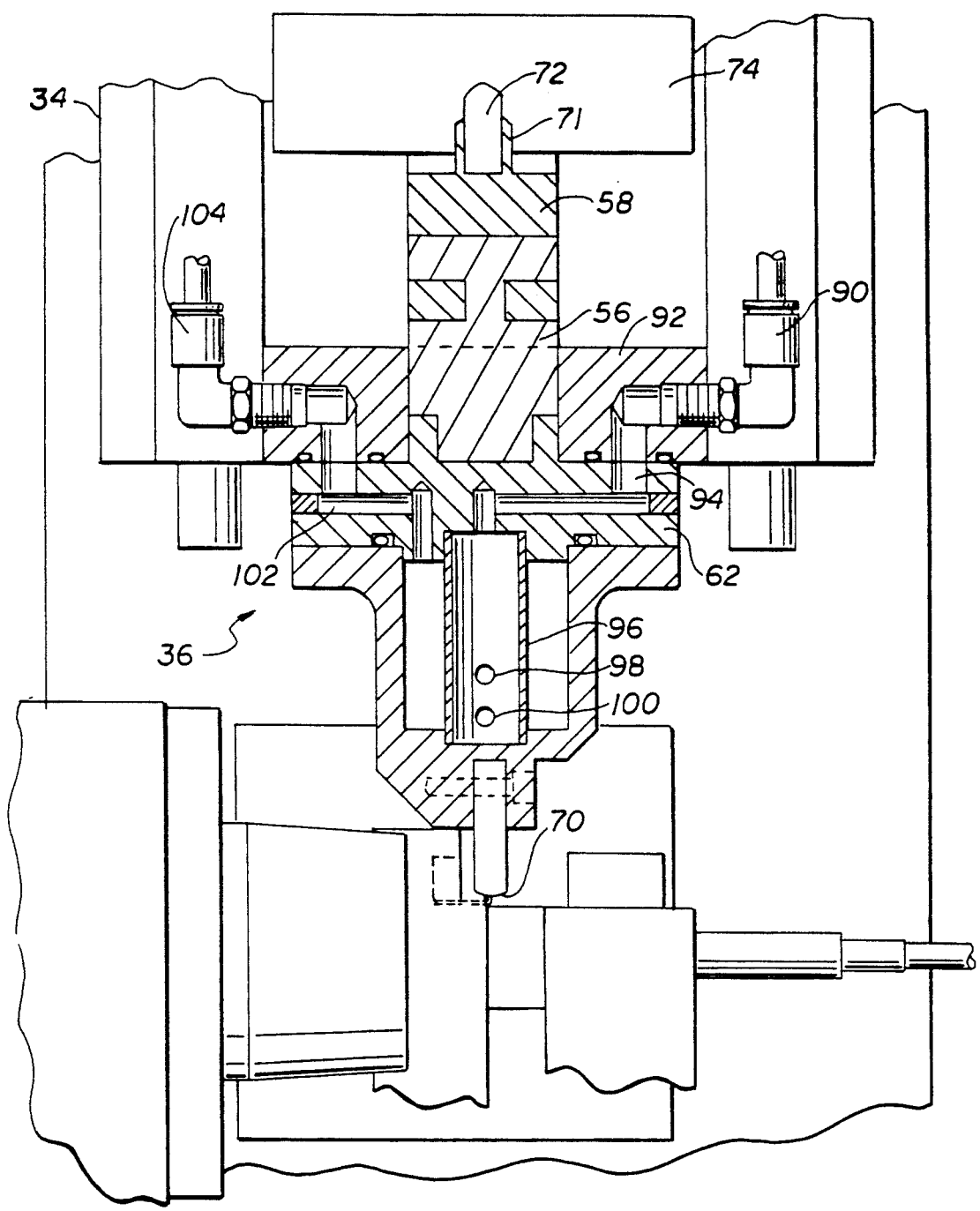
FIG. 3 is an enlarged fragmentary front view of a portion of FIG. 2 showing the electrode holder.

The fusing machine includes a center flow cooling design for the electrode holder as also illustrated in FIG. 3. An inlet water line 90 is connected to a water inlet 92 located above the water jacket 62 of the electrode holder 36. A channel 94 is formed in the water inlet and extends downwardly into the water jacket. The channel 94 extends towards the center of the water jacket and opens into a cooling sleeve 96 located at the center of the electrode holder. The cooling sleeve 96 is a cylindrical tube containing two ports 98, 100 located toward the bottom portion of the cooling sleeve which allows the water to exit the cooling sleeve. The water exits through an exit channel 102 extending through the opposite side of the water jacket 62, continuing through the opposite side of the water inlet 92 and out through an exit water line 104 before returning to a reservoir (not shown). The water is circulated through the electrode holder to prolong the useful life of the electrode 22. The ground electrode 54 (FIGS. 1 and 2) is also cooled by water lines 106, 108.

Figure 6:
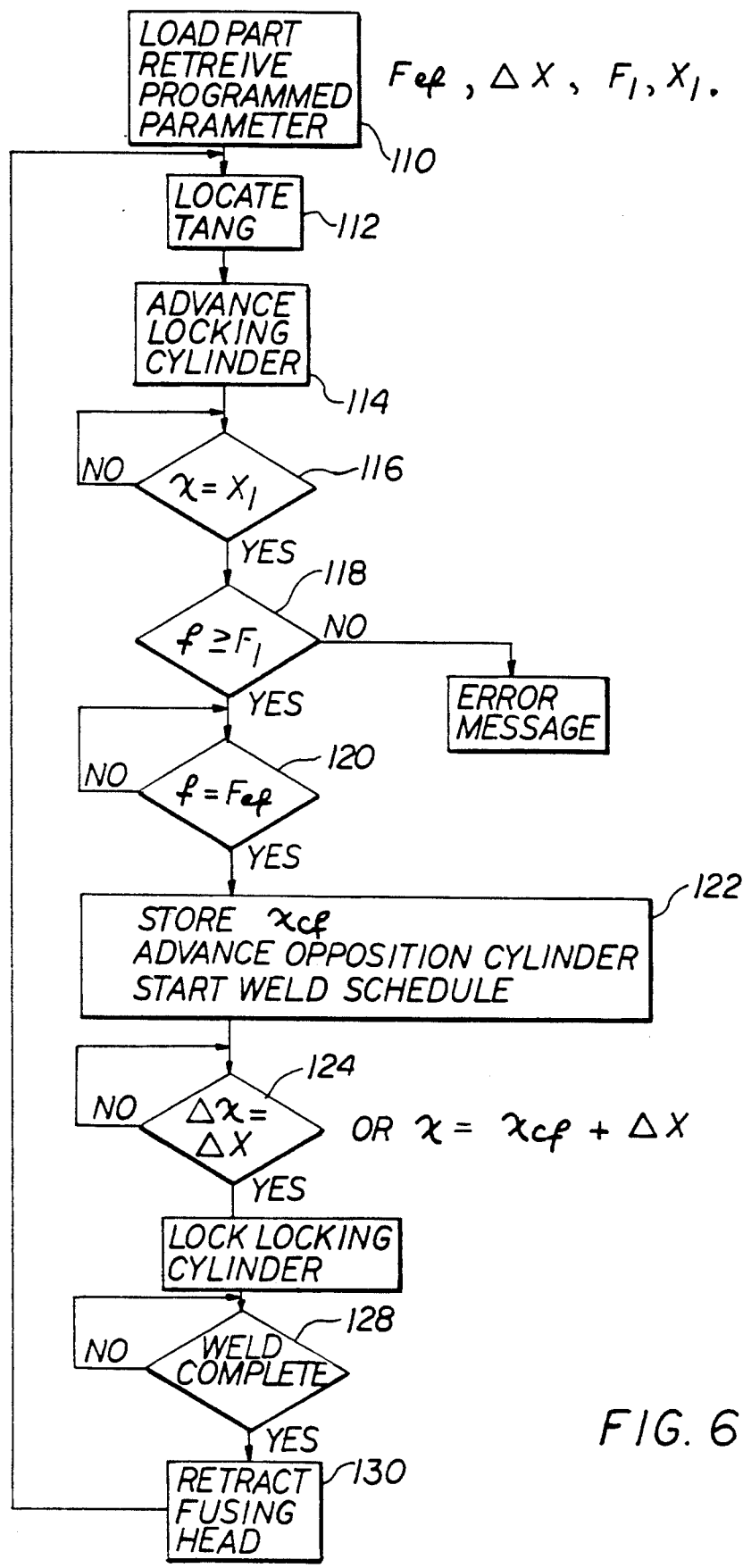
FIG. 6 is a flow diagram illustrating the method for fusing a workpiece of the present invention.

Referring to FIG. 6, the operation of the fusing apparatus is diagrammed. In the first step 110 the fusing apparatus 10 is initialized and a part number to the run is entered into a welding control and current monitor (not shown) communicating with the fusing apparatus. A welding control and current monitor that can be utilized for the fusing apparatus is one manufactured by Atek Corporation of Chattanooga, Tennessee, and sold under the trademark TruAmp. Once the part number is entered. program parameters for the part number are recalled from memory. Typical parameters programmed are the desired force at the end of the cold-forming process $F(cf)$, the incremental distance to be moved during the welding step after the detection of the cold-forming force $\Delta X$, initial displacement $X(1)$ [detected as an initial error check], and the initial force $F(1)$ [detected as in the initial error check]. Other parameters that may be programmed could be the number of commutator slots and other data that may be used for process conditioned checking. Also occurring at step 110 is that an operator loads an armature 12 into the spindle 18, which could also be done automatically by a robot.

At process step 112, the welding control operates a laser sensor (not shown) which scans the commutator for slots as the spindle 18 rotates slowly. Once both edges of the slots are detected, the controller subtracts half the distance and indexes the part to the first fusing position.

In step 114, the forward solenoid of the locking cylinder 26 is energized advancing the fusing head 34 toward the tang 16. At step 116, the process detects whether the current position is equal to the programmed position $X(1)$. If it is, at process step 118, the load cell 32 is monitored to determine whether the current measured force is equal to or greater than the program force $F(1)$. If the electrode has passed the position $X(1)$, and the force has not reached the initial threshold value $F(1)$, an error condition exists and the operator is warned by the welding control. An error condition can be caused by the absence of a wire in the slot, a malformed slot, or the absence of a tang, among others. If the force is equal to the programmed force $F(1)$, the process concludes that the electrode is in contact with the tang 16 on the commutator.

At step 120, the process monitors the load cell 32 to determine when the force becomes equal to the programmed cold-forming force $F(cf)$. When equality is detected, at step 122, the controller stores the cold-forming force position as read from the linear potentiometer 48, energizes the forward solenoid of the opposition cylinder 50 and initiates the weld schedule. At the point where the weld begins, all the necessary cold-forming of the tang has taken place and less force is needed to complete the weld, therefore, as the weld begins, the opposition cylinder is fired to relieve a portion of the force being applied by the locking cylinder.

In an alternative embodiment, the weld schedule can be initiated based solely on distance traveled by the fusing head 34 as measured by the linear potentiometer 48. Once the fusing head has traveled a predetermined distance, the weld cycle and the opposition force are initiated to complete the weld.

Without any closed loop control, the locking cylinder continues to move the electrode 22 into the tang 16 or slot, thereby continuing to deform the tang and wire while the welding is passing therethrough. When the electrode has moved through an incremental displacement equal to the program differential displacement, $\Delta X$, the locking cylinder is locked at that position at step 126. It should also be noted that the controller memorizes the position given it by the linear potentiometer 48 when the correct cold-forming force has been reached. The controller then monitors the linear potentiometer throughout the weld until the correct differential distance has been reached. This is the distance programmed from the end of the cold-forming to the end of the weld cycle. This feature should cause a repeatable wire deformation to take place.

At step 128, the process determines when the weld schedule is complete, and when that occurs, at process 130, the electrode 22 is retracted only a sufficient distance to allow the spindle to position another tang or slot beneath the electrode.

Steps 112 through 130 are then repeated for the remainder of the workpiece, it should be noted that for the remaining fuses on the first part, the controller remains in a teach mode. On a typical armature, there will be two tangs that will have two wires each, therefore, these two tangs will have a different cold forming position and a different differential distance. They could also have a different weld schedule.

The preceding description has been presented with reference to a presently preferred embodiment to the invention shown in the drawings. Workers skilled in the art and technology to which this invention pertains will appreciate that alterations and changes in the described structure can be practiced without departing from the spirit, principles and scope of this invention.

What is claimed is:

1. An apparatus for fusing a workpiece consisting of at least two electrically conductive elements comprising:
   an electrode;
   means for moving the electrode into contact with said workpiece causing said electrode to apply a force to said workpiece;
   means for monitoring the force applied by said electrode; and
   means for applying an opposition force to said electrode when a predetermined force has been reached by said electrode to relieve a portion of said force applied by said electrode to said workpiece.

2. The apparatus of claim 1 further comprising means for measuring the distance traveled by said electrode.

3. The apparatus of claim 1 further comprising means for stopping said electrode after said predetermined force has been reached when a predetermined distance has been traveled by said electrode.

4. The apparatus of claim 1 wherein said means for moving said electrode is a pneumatic cylinder.

5. The apparatus of claim 1 wherein said means for monitoring said force applied by said electrode is a load cell.

6. The apparatus of claim 1 wherein said means for applying an opposition force is a pneumatic cylinder.

7. The apparatus of claim 1 wherein said means for applying an opposition force are a pair of proportional valves; one of said proportional valves located at either end of said locking cylinder.

8. The apparatus of claim 2 wherein said means for measuring distance traveled by said electrode is a linear potentiometer.

9. The apparatus of claim 1 wherein said apparatus further includes a fuser head and a quick change electrode holder.

10. The apparatus of claim 9 wherein said quick change electrode holder includes a first interlocking piece and said fuser head includes a second interlocking piece connected to a pneumatic cylinder.

11. The apparatus of claim 10 wherein said first interlocking piece includes a middle portion, a truncated head portion, and a neck portion connecting said middle portion to said truncated head portion; and
   wherein said second interlocking piece includes a middle portion and two leg portions extending from said middle portion and spaced from one another so as to define a vertical channel therebetween, and each said leg having a horizontal channel formed therein and extending from opposite surfaces thereof such that said head portion of said first piece is received in said channel and upon rotation of said first piece with respect to said second piece, said head portion is received in said horizontal channels to provide an interlocking fit between said head portion of said first interlocking piece and said leg portions of said second piece.

12. The apparatus of claim 11 wherein said second interlocking piece further includes a pin for proper orientation of said first interlocking piece.

13. The apparatus of claim 12 wherein said electrode holder further includes a central flow cooling system.

14. A method for fusing a workpiece including at least two electrically conductive elements comprising the steps of:
   moving an electrode into contact with said workpiece;
   applying a force to said workpiece;
   monitoring said applied force until a predetermined force is reached;
   initiating a weld cycle;
   applying an opposition force to said workpiece to relieve a portion of said force;
   measuring electrode distance travel after said opposition force is applied; and
   stopping said electrode after a predetermined distance has been traveled by said electrode.

15. A method for fusing a workpiece including at least two electrically conductive elements comprising the steps of:
   moving an electrode into contact with said workpiece;
   applying a force to said workpiece;
   monitoring said electrode movement until a predetermined distance is reached;
   initiating a weld cycle;
   applying an opposition force to said workpiece to relieve a portion of said force;
   measuring electrode distance travel after said opposition force is applied; and
   stopping said electrode after a predetermined distance has been traveled by said electrode.

* * * * *